(12) United States Patent
Tada et al.

(10) Patent No.: US 8,424,463 B2
(45) Date of Patent: Apr. 23, 2013

(54) INTERIOR STRUCTURE FOR RAILWAY VEHICLE

(75) Inventors: Akihiko Tada, Kobe (JP); Chihiro Okayama, Kakogawa (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 184 days.

(21) Appl. No.: 12/972,768

(22) Filed: Dec. 20, 2010

(65) Prior Publication Data

US 2011/0206877 A1 Aug. 25, 2011

(30) Foreign Application Priority Data

Dec. 22, 2009 (JP) ................................. 2009-290416

(51) Int. Cl.
B61D 17/18 (2006.01)
(52) U.S. Cl.
USPC ............ 105/423; 105/404; 105/397; 105/396
(58) Field of Classification Search .................. 105/396, 105/397, 399, 400, 401, 404, 407, 409, 423
See application file for complete search history.

(56) References Cited

U.S. PATENT DOCUMENTS

| | | | | | |
|---|---|---|---|---|---|
| 3,033,130 | A | * | 5/1962 | Erickson | 105/396 |
| 3,163,434 | A | * | 12/1964 | Krueger | 280/832 |
| 3,711,148 | A | * | 1/1973 | Hindin | 296/181.6 |
| 4,319,528 | A | * | 3/1982 | Gutridge et al. | 105/397 |
| 5,188,039 | A | * | 2/1993 | Ohmura et al. | 105/423 |
| 5,802,984 | A | * | 9/1998 | Thoman et al. | 105/404 |
| 5,890,435 | A | * | 4/1999 | Thoman et al. | 105/404 |
| 6,092,473 | A | * | 7/2000 | Altenburg et al. | 105/404 |
| 6,138,580 | A | * | 10/2000 | Thoman | 105/396 |
| 6,219,983 | B1 | * | 4/2001 | Gråkjaar et al. | 52/403.1 |
| 6,986,546 | B2 | * | 1/2006 | Ehrlich | 296/191 |
| 7,210,413 | B2 | * | 5/2007 | Barry et al. | 105/404 |
| 7,228,805 | B2 | * | 6/2007 | Beers et al. | 105/423 |
| 7,261,044 | B2 | * | 8/2007 | Creighton et al. | 105/404 |
| 7,478,600 | B2 | * | 1/2009 | Beers et al. | 105/423 |
| 2002/0129733 | A1 | * | 9/2002 | Kennedy | 105/8.1 |
| 2007/0068418 | A1 | * | 3/2007 | Heitmeyer et al. | 105/404 |
| 2007/0214998 | A1 | * | 9/2007 | Komaki et al. | 105/396 |
| 2007/0234927 | A1 | * | 10/2007 | Beers et al. | 105/404 |
| 2010/0077935 | A1 | * | 4/2010 | Harada et al. | 105/397 |
| 2010/0089283 | A1 | * | 4/2010 | Kono et al. | 105/397 |
| 2010/0132589 | A1 | * | 6/2010 | Harada et al. | 105/397 |
| 2011/0206877 | A1 | * | 8/2011 | Tada et al. | 428/35.8 |

FOREIGN PATENT DOCUMENTS

| | | |
|---|---|---|
| CN | 200710084276 | 8/2007 |
| JP | A-2004-075054 | 3/2004 |

* cited by examiner

Primary Examiner — Jason C Smith
(74) Attorney, Agent, or Firm — Oliff & Berridge, PLC

(57) ABSTRACT

An interior structure is provided that is lightweight and is capable of beautifully finishing a surface on a cabin side. An interior structure 100 of the present invention includes a plurality of interior panels 1 forming the inner walls of a cabin and a support means 5 for supporting the interior panel 1. The interior panel 1 has a composite plate 4 including two metal plates 2 and a non-foam resin layer 3 disposed between the two metal plates 2.

9 Claims, 10 Drawing Sheets

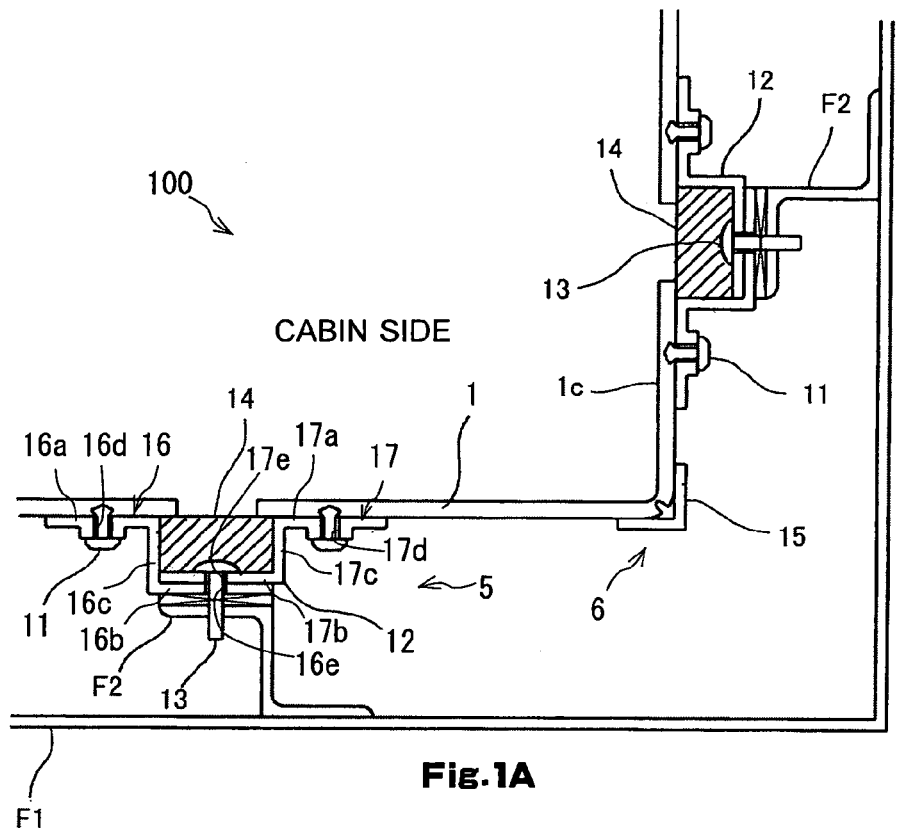
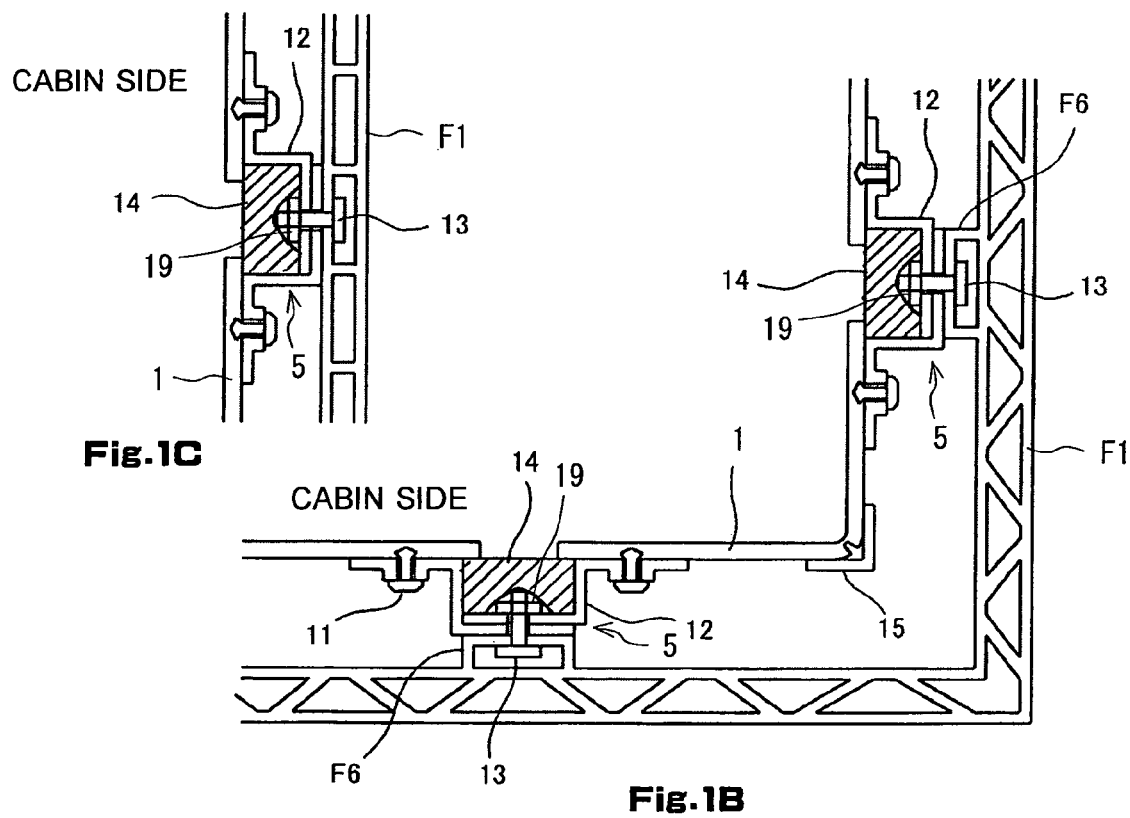

INTERIOR STRUCTURE FOR RAILWAY VEHICLE

TECHNICAL FIELD

The present invention relates to an interior structure for a railway vehicle.

BACKGROUND ART

As an interior structure for a railway vehicle, an interior structure 800 shown in FIG. 11A that uses a reinforcement frame (referred to, hereinafter, as a "frame-type interior structure") and an interior structure 900 shown in FIG. 11B in which a core member is stacked together with an inside panel and an aluminum plate (referred to, hereinafter, as a "sandwich-type interior structure") are known. The above-described FIG. 11A and FIG. 11B show the interior structure at a door pocket (a side entrance of the railway vehicle that houses a door) where the highest stiffness is required. As shown in FIG. 11A, the frame-type interior structure 800 mainly includes a reinforcement frame 802 formed by a combination of metal-made rod members, and an inside panel 801 mounted on the reinforcement frame 802. The inside panel 801 is formed by stacking an aluminum layer, a melamine layer, and a sheet of paper on which a pattern is printed. The overall thickness of the inside panel 801 is about 1.4 mm to 1.6 mm. A portion indicated by reference symbol 803 in FIG. 11A is a body framing of a border between a side wall of a cabin and a ceiling (the same applies to a portion indicated by reference symbol 903 in FIG. 11B).

On the other hand, as shown in FIG. 11B, although the sandwich-type interior structure 900 does not include a reinforcement frame, the sandwich-type interior structure 900 includes, in addition to an inside panel 901a, a core member 901b mounted on the back surface of the inside panel 901a and having a thickness of 10 mm or more, and an aluminum plate 901c further mounted on the back surface of the core member 901b, all of which are bonded to each other by an adhesive. As the core member 901b, resin-based foam material including a vinyl chloride foam material and a urethane foam material, or a honeycomb material including paper honeycomb is used. A panel 901 in which the inside panel 901a, the core member 901b, and the aluminum plate 901c are stacked (referred to, hereinafter, as a "sandwich panel") has a thickness of about 15 mm. Patent Literature 1 describes this sandwich panel.

CITATION LIST

Patent Literature

Patent Literature 1: Japanese Laid-Open Patent Application Publication No. 2004-75054

SUMMARY OF INVENTION

Technical Problem

In general, from the perspective of increased carrying capacity and economical efficiency, weight-saving of the vehicle is often demanded in railway vehicles. However, a problem occurs in the frame-type interior structure 800 in that, because the reinforcement frame 802 is extremely heavy, weight-saving of the railway vehicle is impeded.

In addition, because the interior structure is provided within the cabin, the aesthetics experienced by passengers is also affected. However, in the sandwich-type interior structure 900 described in Patent Literature 1; when rivets or bolts are used because the stiffness of the core member 901b is low, and the bonding strength between the core member 901b and the surface metal layers 901a and 901c is low, the rivets and the like are required to pierce the sandwich panel 901. Thus, the rivets and the like are exposed on the cabin side.

Furthermore, in the sandwich-type interior structure 900, when the coefficients of thermal expansion of the respective layers are different from each other, distortion of the inside panel and the like may occur over long-time use. In this way, the sandwich-type interior structure 900 has a problem that aesthetics is affected.

The present invention has been achieved to solve problems such as those described above. An object of the present invention is to provide an interior structure that is lightweight and is capable of beautifully finishing a cabin-side surface.

Solution to Problem

The present invention has been achieved to solve problems such as those described above. An interior structure of the present invention includes a plurality of interior panels forming the inner walls of a cabin and a support means for supporting the interior panel. The interior panel has a composite plate including two metal plates and a non-foam resin layer disposed between the two metal plates. According to the configuration, a reinforcement frame is not required because the composite plate has high stiffness. Furthermore, rivets and the like are not required to pierce the interior panel because the rivets and the like can be firmly fastened in the non-foam resin layer when the interior panel is fastened.

Advantageous Effects of Invention

As described above, the interior structure of the present invention is lightweight and is capable of beautifully finishing the cabin-side surface, because a reinforcement frame is not required and rivets and the like are not required to pierce the interior panel when the interior panel is fastened.

BRIEF DESCRIPTION OF THE DRAWINGS

FIG. 1A is a horizontal cross-sectional view of an interior structure according to Embodiment 1 of the present invention.

FIG. 1B is a diagram of a modification example of the interior structure according to Embodiment 1 of the present invention.

FIG. 1C is a diagram of a modification example of the interior structure according to Embodiment 1 of the present invention.

DESCRIPTION OF EMBODIMENTS

Figure 2A:
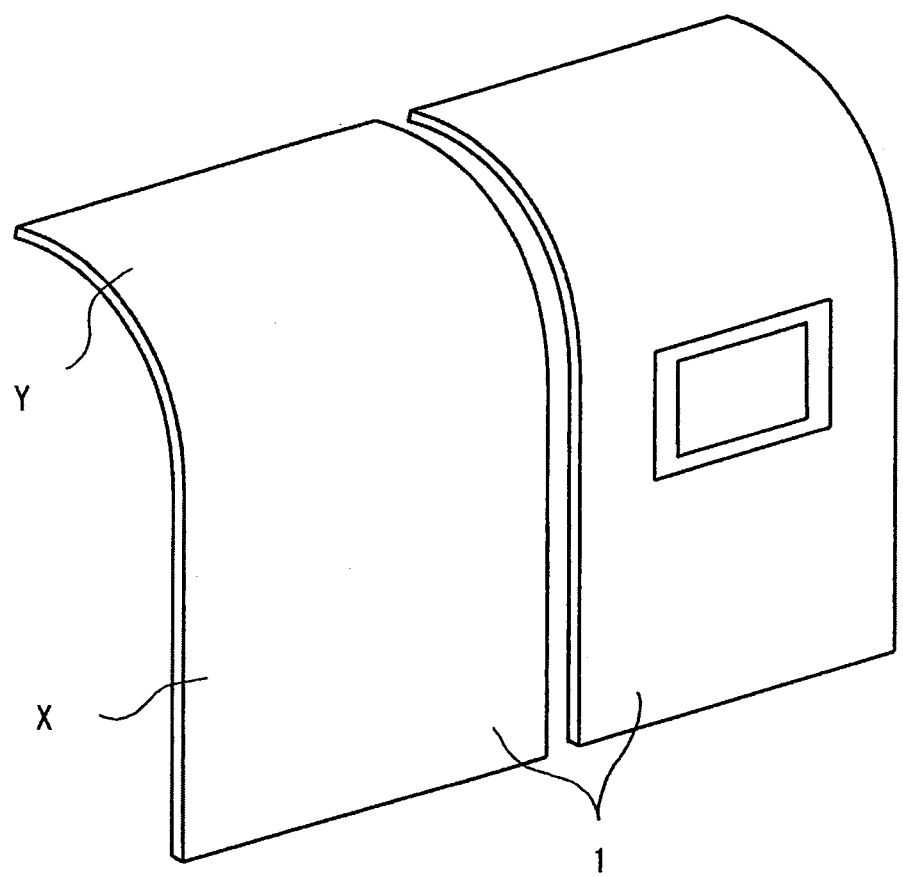
FIG. 2A is a perspective view of an interior panel according to Embodiment 1 of the present invention.

Embodiments of an interior structure for a railway vehicle of the present invention will hereinafter be described with reference to the drawings. Throughout the drawings, the same or corresponding constituents are designated by the same reference symbols and will not be described repetitively.

Embodiment 1

First, an interior structure 100 according to Embodiment 1 will be described with reference to FIG. 1A to FIG. 4. Here, FIG. 1A is a horizontal cross-sectional view of the interior structure 100 according to the present embodiment. As shown in FIG. 1A, the interior structure 100 according to the present embodiment includes an interior panel 1, a support member 12, a reinforcement member 15, and a fastening member 11. These constituent elements will hereinafter be described in sequence. Assembling methods for the interior panel 1 will also be described. A cabin-side surface of the interior panel 1 will hereinafter be referred to as a "cabin surface". The surface of the interior panel 1 on the side opposite of the cabin surface will be referred to as a "back surface". Furthermore, the thickness direction of the interior panel 1 will simply be referred to as "thickness direction", and the width direction of the interior panel 1 will simply be referred to as "width direction".

<Interior Panel>

Figure 2B:
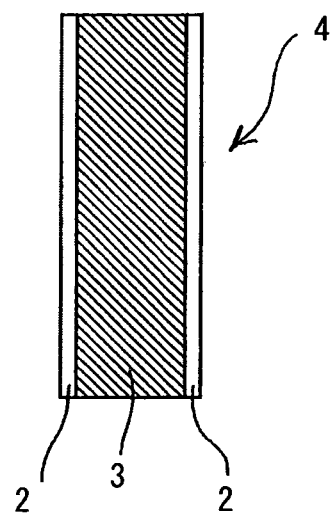
FIG. 2B is a cross-sectional view of the interior panel according to Embodiment 1 of the present invention.

The interior panel 1 is a member forming an inner wall of the cabin. FIG. 2A is a perspective view of the interior panel 1 according to the present embodiment. FIG. 2B is a cross-sectional view of the interior panel 1 according to the present embodiment. As shown in FIG. 2A, among the sections forming the cabin, the interior panel 1 according to the present embodiment is equivalent to a side wall and a section connecting the side wall to a ceiling. The section connecting the side wall to the ceiling is curved. The minimum radius of the curved section is, for example, a maximum of about 150 mm.

In addition, as shown in FIG. 2B, the interior panel 1 according to the present embodiment has a composite plate 4 composed of two metal plates 2, and a non-foam resin layer 3 filled between the two metal plates 2. As the non-foam resin layer 3, for example, a polypropylene, polyester, or polyolefin synthetic resin mixed with a metal hydroxide, such as aluminum hydroxide, is used. As the metal plate 2, for example, an aluminum plate or an aluminum alloy plate is used. When the metal plate 2 is an aluminum plate or an aluminum alloy, the interior panel 1 can become lighter in weight.

The thickness of each metal plate 2 is 0.1 mm to 1.0 mm, preferably 0.2 mm to 0.6 mm. The thickness of the composite plate 4 is 2.0 mm to 10.0 mm, preferably 3.0 to 5.0 mm. When the thickness of each metal plate 2 and the thickness of the composite plate 4 are within the above-described ranges, weight-saving can be achieved while having the required stiffness. In addition, a bending process by a radius of curvature of about 150 mm can be performed with no difficulty.

In addition, in the above-described composite plate 4, each metal plate 2 and the resin layer 3 are integrally formed by heat-welding. Because adhesives are not used in heat-welding, vaporization and expansion of an adhesive causing the composite plate 4 to get deformed does not occur. If the metal plates on the cabin-surface side and the back-surface side are made of the same material, because the coefficient of thermal expansion is the same on both sides of the composite plate 4, distortion of the composite plate 4 due to a temperature change can be prevented. As the composite plate 4, for example, "Plametal" (registered trademark) manufactured by Sekisui Jushi Plametal Co., Ltd. can be used.

Furthermore, in the interior panel 1 according to the present embodiment, a fluororesin or a polyester resin may be applied to the cabin-surface side of the above-described composite plate 4. Alternatively, a coating, such as acrylic coating, may be applied. Because the fluororesin and the like have flexibility, the bending process by a radius of curvature of about 150 mm does not cause the coating to peel or crack. In areas in which the bending process is not performed, an inside panel or a decorative sheet including a melamine layer may be bonded to the cabin-surface side of the composite plate 4. Melamine resin is advantageous in that it is not easily damaged even over long-time use. Furthermore, if a sheet of paper on which a pattern is printed is laminated on the melamine resin, the design quality can be improved.

As described above, because the interior panel 1 according to the present embodiment uses the composite plate 4 that is lightweight and has high stiffness as a base, the number of reinforcement frames can be lessened to a minimum, thereby achieving weight-saving of the interior structure 100 and, hence weight-saving of the overall railway vehicle.

<Support Member>

The support member 12 is a member that fastens the interior panel 1 to the carbody and supports the interior panel 1. The support member 12, together with the fastening member 11, described hereafter, configures a support means 5. As shown in FIG. 1A, the support member 12 is positioned near the border between the interior panels 1, and configured by a first support member 16 and a second support member 17 that are both substantially Z-shaped. The support member 12 couples an outer board F1 and two interior panels 1 with a mounting member F2 therebetween. The support member 12 and the interior panels 1 are fastened together by the fastening member 11, described hereafter.

The first support member 16 has a plate-shaped first panel side portion 16a that is in contact with the interior panel 1, a plate-shaped first carbody side portion 16b that extends in parallel with the first panel side portion 16a and is positioned closer to the outer board F1 than the first panel side portion 16a, and a first coupling portion 16c that couples the first panel side portion 16a and the first carbody side portion 16b to each other. A first rivet hole 12a is formed in the first panel side portion 16a, and a first bolt hole 16e is formed in the first carbody side portion 16b.

The second support member 17 has a plate-shaped second panel side portion 17a that is in contact with the interior panel 1, a plate-shaped second carbody side portion 17b that extends in parallel with the second panel side portion 17a and is positioned closer to the outer board F1 than the second panel side portion 17a, and a second coupling portion 17c that couples the second panel side portion 17a and the second carbody side portion 17b to each other. A second rivet hole 17d is formed in the second panel side portion 17a, and a second bolt hole 17e is formed in the second carbody side portion 17b.

When the tip end of the second carbody side portion 17b is disposed such as to be in contact with the first coupling portion 16c, and the second support member 17 and the first support member 16 are disposed in this order from the cabin side, the first bolt hole 16e and the second bolt hole 17e become coaxial with each other. In such a configuration, a gap is formed at the border between the two interior panels 1. Therefore, a fastening bolt 13 can be inserted, and the first support member 16 and the second support member 17 can be easily fastened together.

Furthermore, because the second coupling portion 17c is shorter than the first coupling section 16c, when the first support member 16 and the second support member 17 are overlapped, the first panel side portion 16a and the second panel side portion 17a are coplanar with each other, and the adjacent interior panels 1 become coplanar with each other.

<Reinforcement Member>

The reinforcement member 15 is a member that reinforces the interior panel 1, and is mounted on the back surface of a portion of the interior panel 1 in which a portion of the metal plate 2 on the back side and a portion of the resin layer 3 are cut, and the portion of the interior panel 1 is bent at a right angle. The reinforcement member 15 has an L-shaped cross-section. According to the present embodiment, the reinforcement member 15 is bonded to the interior panel 1.

Figure 3A:
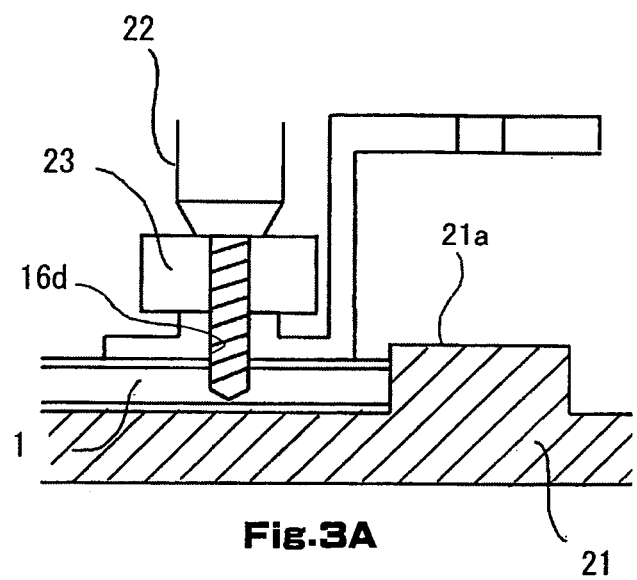
FIG. 3A is a diagram of an assembling method of the interior panel according to Embodiment 1 of the present invention.
Figure 3B:
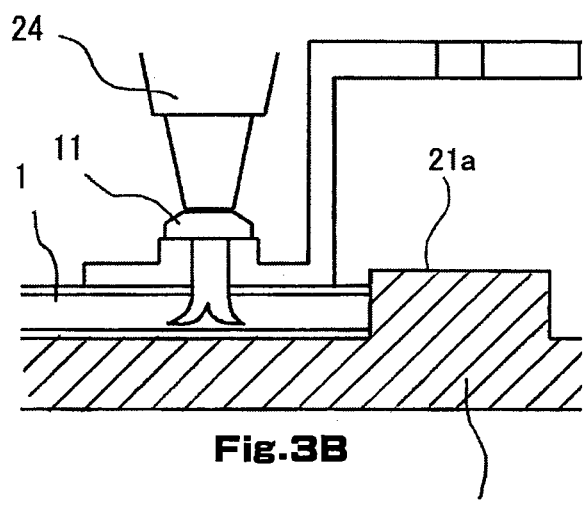
FIG. 3B is a diagram of the assembling method of the interior panel according to Embodiment 1 of the present invention.
Figure 3C:
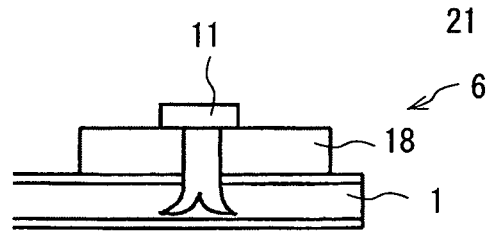
FIG. 3C is a diagram of the assembling method of the interior panel according to Embodiment 1 of the present invention.

The reinforcement member includes a fastening plate 18 shown in FIG. 3C. When an interior finishing, such as a grab rail, is bolted onto the interior panel 1, the fastening plate 18 enables a bolt to be deeply screwed into the area. The fastening plate 18 is mounted on the back surface of the interior panel 1 in some instances. The fastening plate 18 is also included in the reinforcement member. The fastening plate 18 is fastened to the interior panel 1 by the fastening member 11 and, together with the fastening member 11, configures a reinforcing means 6.

<Fastening Member>

The fastening member 11 is a member used to attach the support member 12 and a cover member 34 to the interior panel 1. As the fastening member 11 according to the present embodiment, a so-called blind rivet is used. The blind rivet has a feature that riveting can be performed even by work from only one side. The fastening member 11 pierces the support member 12 or the cover member 34 and is embedded in the interior panel 1 from the back surface of the interior panel 1. The fastening member 11 does not pierce through the composite plate 4 of the interior panel 1, and its tip end is positioned within the resin layer 3 of the composite plate 4 configuring the interior panel 1.

Because the composite plate 4 uses a non-foam resin instead of a foam resin as the core member, the fastening member 11 (the support member 12 and the like) can be firmly fastened to the interior panel 1 without the fastening member 11 having to pierce the composite plate 4. As a result, the fastening member 11 is not exposed on the cabin-surface side of the interior panel 1, and the aesthetic quality is not impaired. As the fastening member 11, a bolt having a length such that its tip end is positioned within the resin layer 3 may be used instead of the blind rivet. Furthermore, the support member 12 and the like may be fastened to the interior panel 1 by welding or bonding, without use of the fastening member 11.

<Assembling Method>

Next, an assembling method of the interior panel according to the present embodiment will be described.

First, the first support member 16 is fastened to one side in the width direction of each interior panel 1, and the second support member 17 is fastened to the other side in the width direction. The first support member 16 and the second support member 17 are fastened by the fastening member 11. For example, as shown in FIG. 3A, positioning of the first support member 16 is performed in such a manner that the first rivet hole 16d is positioned at a predetermined location, after the interior panel 1 is placed with the cabin surface facing down on a worktable 21 with a smooth and hard surface, and the first support member 16 is further placed on top thereof. Then, a stopper jig 23 having an opening in the center is placed on the first support member 16, and a step drill 22 is inserted through the hole in the stopper jig 23 and the first rivet hole 16d. In this state, a pilot hole is formed in the interior panel 1 by the step drill 22. The bottom of the pilot hole is positioned within the resin layer 3 of the composite plate 4. Because the stopper jig 23 is used, the pilot hole does not pierce the interior panel 1. After the pilot hole is formed, as shown in FIG. 3B, the stopper jig 23 is removed, and the fastening member 11 (blind rivet) is punched into the above-described pilot hole by a riveter 24. FIG. 3C shows a state in which the above-described fastening plate 18 (reinforcement member) is fastened to the interior panel 1.

Next, the second support member 17 that is fastened to another interior panel 1 is coupled with the first support member 16 that is fastened to the interior panel 1 to form a single support member 12, and the support member 12 is mounted on the carbody. The mounting member F2 is provided on the outer board F1 of the carbody. The support member 12 and the mounting member F2 are fastened together by the fastening bolt 13. As described above, as a result of the first support member 16 and the second support member 17 being coupled at predetermined relative positions, the first bolt hole 16e and second bolt hole 17e respectively formed in the first support member 16 and the second support member 17 are coaxial with each other. The fastening bolt 13 is then inserted into the overlapping first bolt hole 16e and second bolt hole 17e. A screw hole is formed in the mounting member F2, and the fastening bolt 13 that has been inserted through both bolt holes 16e and 17e is screwed into the screw hole. Then, when the above-described operation is performed on each interior panel 1, the inner walls of the cabin are formed. The gap formed at the border between the adjacent interior panels 1 may be filled with a soft filler member 14, such as a sponge, to prevent foreign matters from getting caught therein.

The mounting member F2 is provided on the outer board F1 as described above. However, depending on the configuration of the outer board F1, the interior panel 1 can be mounted using a different method. For example, as shown in FIG. 1B, when applied to an outer board F1 having a double-skin structure, a groove F6 may be formed that extends on the cabin side in a vertical direction of the vehicle. In such a configuration, the support member 12 is fastened to the groove F6 using the fastening bolt 13 and a fastening nut 19. Alternatively, as shown in FIG. 1C, the support member 12 can be directly fastened to the outer board on the cabin side using the fastening bolt 13 and the fastening nut 19.

Figure 4:
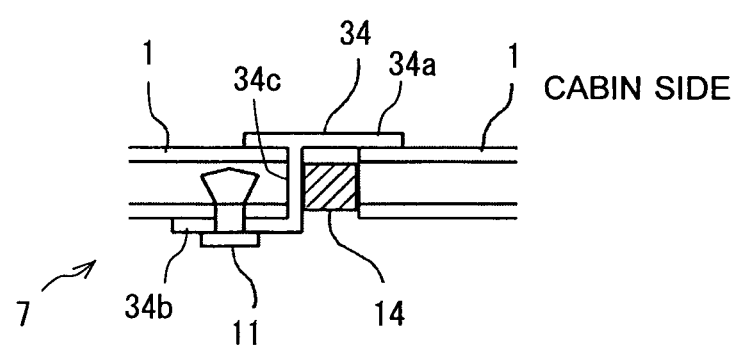
FIG. 4 is a diagram of a cover means according to Embodiment 1 of the present invention.

Furthermore, the interior structure 100 according to the present embodiment may include the cover member 34 that covers the border between the adjacent interior panels 1 from the cabin side, such as that shown in FIG. 4. The cover member 34, together with the above-described fastening member 11, configures a cover means 7. The cover member 34 has a cover portion 34a positioned on the cabin side of the interior panel 1, a mounting portion 34b positioned on the back-surface side of the interior panel 1, and a coupling portion 34c that couples the cover portion 34a and the mounting portion 34b. The coupling portion 34c extends from the center in the width direction of the cover portion 34a towards the outer board F1 side, and the mounting portion 34b extends from the tip end of the coupling portion 34c towards one side in the width direction. In addition, the mounting portion 34b is fastened to the back surface of the interior panel 1 by the fastening member 11. A blind rivet is used as the fastening member 11 and is fastened by a method similar to that described above. As a result, the border between the adjacent interior panels 1 is covered by the cover member 34, and the inner walls of the cabin can be finished more beautifully.

Embodiment 2

Figure 5A:
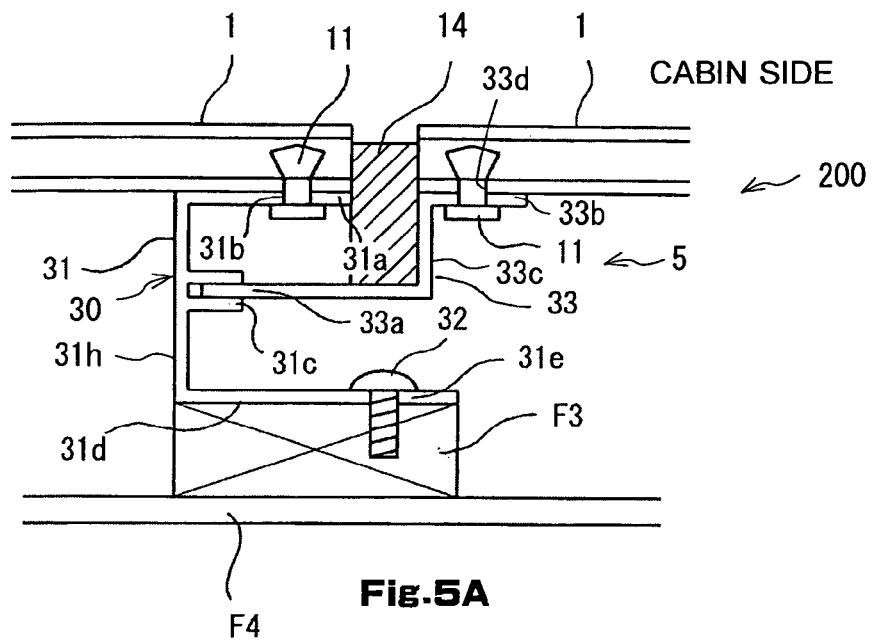
FIG. 5A is a horizontal cross-sectional view of an interior structure according to Embodiment 2 of the present invention.

Next, an interior structure 200 according to Embodiment 2 will be described with reference to FIG. 5A to FIG. 5D. Here, FIG. 5A is a horizontal cross-sectional view of the interior structure 200 according to the present embodiment. Although the configuration of a support member 30 differs from the configuration of the support member 12 according to the Embodiment 1, other configurations of the interior structure 200 according to the present embodiment are almost the same as the configuration of the interior structure 100 according to the Embodiment 1. The configuration of the support member 30 according to the present embodiment will hereinafter be mainly described.

As shown in FIG. 5A, the support member 30 according to the present embodiment includes a first support member 31 and a second support member 33.

The first support member 31 has a plate-shaped first panel side portion 31a that is in contact with the interior panel 1, a plate-shaped first carbody side portion 31d that extends in parallel with the first panel side portion 31a and is positioned on the carbody side (the outer board F4 side), a first coupling portion 31h that couples the first panel side portion 31a and the first carbody portion 31d, and a first engagement portion 31c that is positioned near the center of the first coupling portion 31h. A first rivet hole 31b is formed in the first panel side portion 31a, and a first bolt hole 31e is formed in the first carbody side portion 31d. The first engagement portion 31c has a groove shape that is open towards the second support member 33.

Figure 5B:
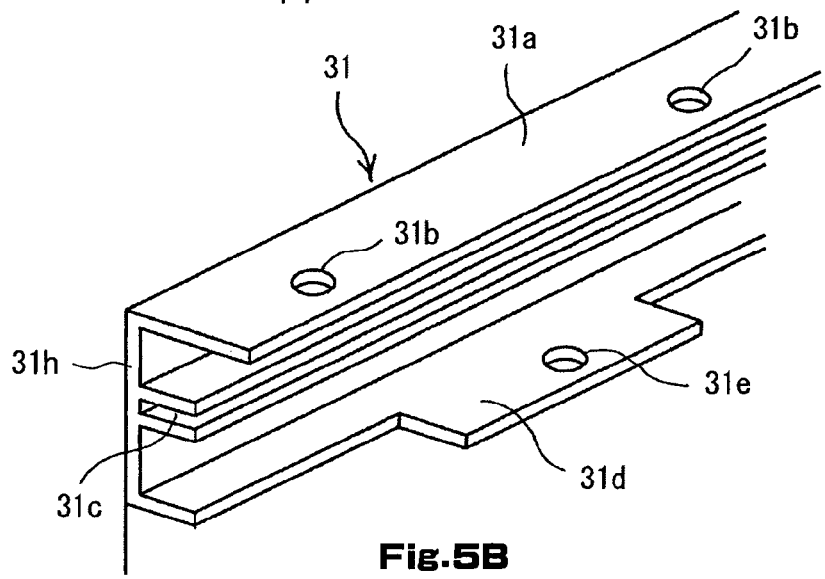
FIG. 5B is a perspective view of a first support section according to Embodiment 2 of the present invention.

FIG. 5B is a perspective view of the first support member 31. As shown in FIG. 5B, a portion of the first carbody side portion 31d in which the first bolt hole 31e is formed is configured to project further towards the second support member 33 than the first panel side portion 31a and the first engagement portion 31c. As a result, as shown in FIG. 5A, the first bolt hole 31e is positioned closer to the second support member 33, than the first rivet hole 31b and the like, and is positioned on the outer board F4 side when viewed from the border between the adjacent interior panels 1. In other words, the first panel side portion 31a is formed so as not to be positioned between the border and the first bolt hole 31e. As a result, an operation for fastening a fastening bolt 32 can be performed through the gap at the border.

Figures 5C, 5D:
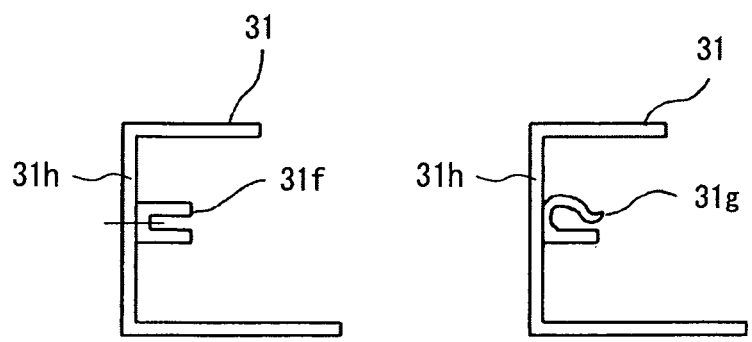
FIG. 5C is a diagram of a modification example of the first support section according to Embodiment 2 of the present invention.
FIG. 5D is a diagram of a modification example of the first support section according to Embodiment 2 of the present invention.

The first support member 31 is not required to be integrally formed. For example, as shown in FIG. 5C, after a first engagement portion 31f is formed as a separate body, the first engagement portion 31f can be fastened to the first coupling portion 31h. Furthermore, as shown in FIG. 5D, of the two portions on both sides of a first engagement portion 31g forming a groove shape, at least one portion may be formed into a curve and configured such as to grip a second engagement portion 33a, as described hereafter.

The second support member 33 has a plate-shaped second panel side portion 33b that is in contact with the interior panel 1, a plate-shaped second e engagement portion 33a that extends in parallel with the second panel side portion 33b and is positioned on the carbody side (the outer board F4 side), and a second coupling portion 33c that couples the second panel side portion 33b and the second engagement portion 33a. A second rivet hole 33d is formed in the second panel side portion 33b. The second engagement portion 33a has a projecting shape that projects towards the first engagement portion 31c, and is formed so as to be engageable with the first engagement portion 31c by being inserted into the first engagement portion 31c. In other words, by moving the second engagement portion 33a towards the first engagement portion 31c along the width direction of the interior panel 1, the second engagement portion 33a becomes engaged with the first engagement portion 31c.

According to the present embodiment, the interior panel 1 is mounted as follows. First, the support member 30 (the first support member 31 and the second support member 33) is fastened to the interior panel 1 by the fastening member 11 (blind rivet). The fastening method is similar to that according to the Embodiment 1. Next, only the first support member 31 is mounted to a mounting portion F3 of the carbody using the fastening bolt 32. In other words, the second support member 33 is not required to be mounted on the vehicle main body. Subsequently, the second engagement portion 33a is moved toward the first engagement portion 31c along the width direction of the interior panel 1, and the second engagement portion 33a is brought into engagement with the first engagement portion 31c. Then, when the above-described operation is performed on each interior panel 1, the inner walls of the cabin are formed. The gap formed between the adjacent interior panels 1 may be filled with the soft filler member 14, such as a sponge.

According to the configuration, because the second support member 33 is not required to be directly screwed or the like onto the carbody, the interior panel 1 can be more easily mounted.

Embodiment 3

Figure 6:
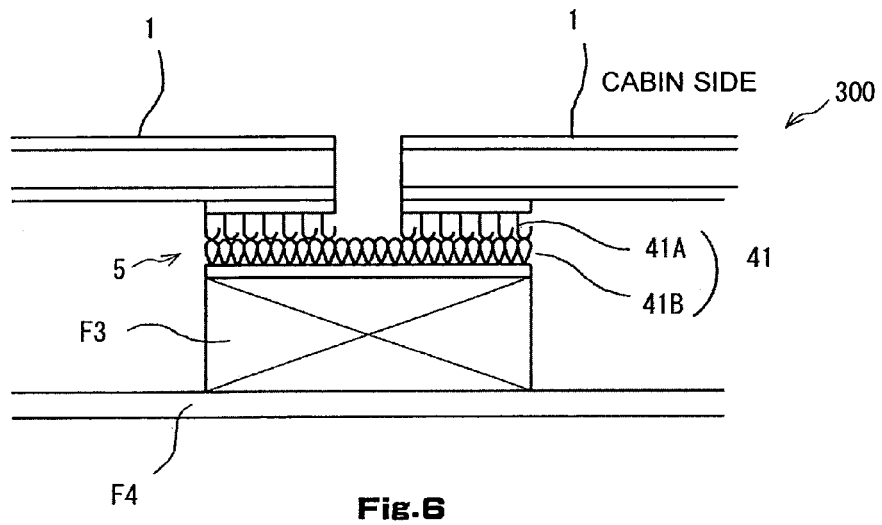
FIG. 6 is a horizontal cross-sectional view of an interior structure according to Embodiment 3 of the present invention.
Figures 7A, 7B:
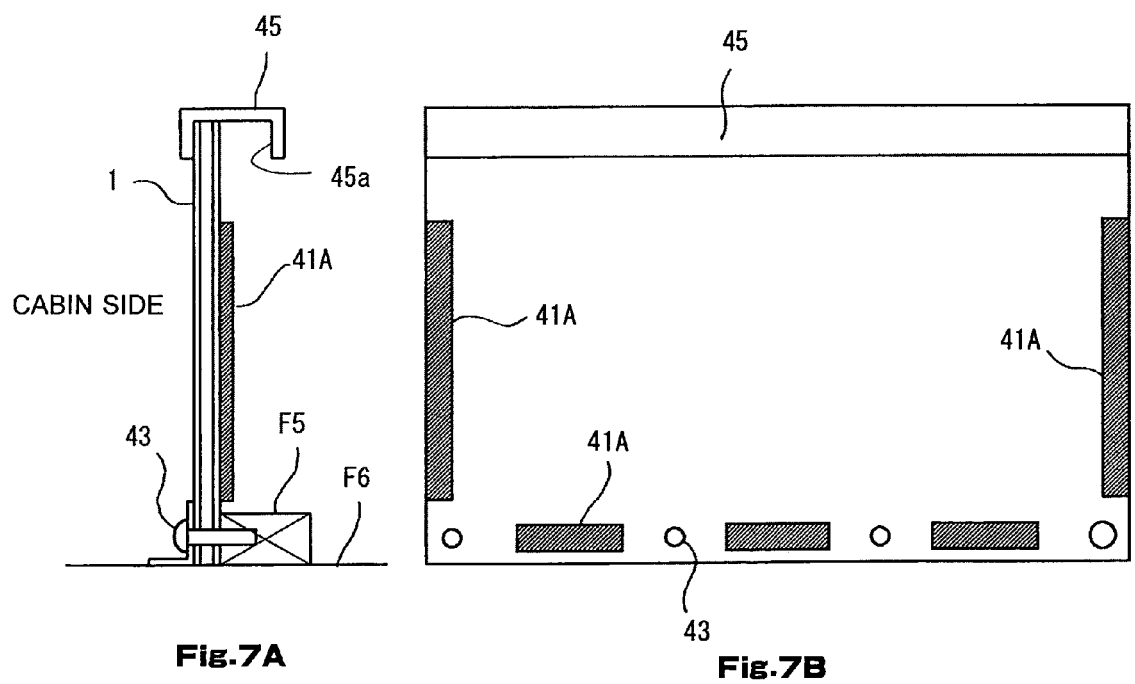
FIG. 7A is a vertical cross-sectional view of the interior structure according to Embodiment 3 of the present invention.
FIG. 7B is a rear view of the interior structure according to Embodiment 3 of the present invention.

Next, an interior structure 300 according to Embodiment 3 will be described with reference to FIG. 6 and FIG. 7B. FIG. 6 is a horizontal cross-sectional view of the interior structure 300 according to the present embodiment. FIG. 7A is a vertical cross-sectional view of the interior structure 300 according to the present embodiment. FIG. 7B is a rear (back surface) view of the interior structure 300 according to the present embodiment. In the interior structure 300 according to the present embodiment, a hook and loop fastener is used as the support means 5. However, other configurations of the interior panel 1 and the like are basically the same as those of the interior structure 100 according to Embodiment 1. Therefore, configuration of the support means 5 according to the present embodiment will hereinafter be mainly described.

As shown in FIG. 6, in the interior structure 300 according to the present embodiment, a hook and loop fastener 41 composed of a hook surface sheet 41A and a loop surface sheet 41B is used as the support means 5, and is disposed between the interior panel 1 and the carbody (the outer board F4). As shown in FIG. 6, the hook surface sheet 41A is mounted on the back surface of the interior panel 1, and the loop surface sheet 41B is mounted on the carbody (the mounting portion F3) side. The surface of the loop surface sheet 41B is less likely to attract dust as compared to the surface of the hook surface sheet 41A. Therefore, if the loop surface sheet 41B is mounted on the carbody (the mounting portion F3) side facing the cabin, trash and dust do not easily collect on the hook and loop fastener 41 even when the trash and dust enter through the gap between the adjacent interior panels 1.

When the hook and loop fastener 41 is used as the support means 5, the lower portion of the interior panel 1 is preferably fastened to the carbody (a mounting portion F5) by a fastening bolt 43 or the like, as shown in FIG. 7A and FIG. 7B. Furthermore, a frame 45 having a groove 45a for inserting the upper edge portion of the interior panel 1 is preferably provided. The width of the groove 45a in the thickness direction is preferably formed to be large enough to allow position adjustment of the interior panel 1 in the thickness direction.

Embodiment 4

Figure 8A:
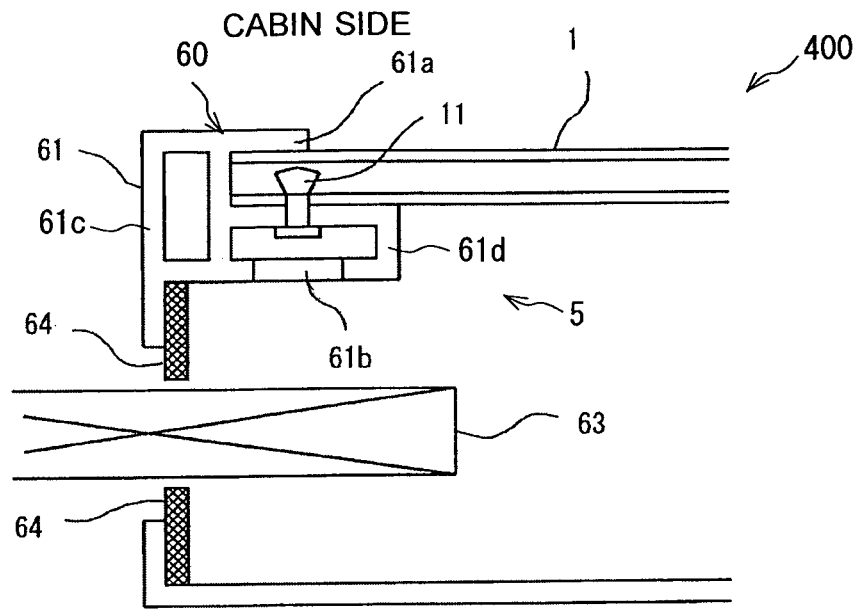
FIG. 8A is a horizontal cross-sectional view of an interior structure according to Embodiment 4 of the present invention.
Figure 8B:
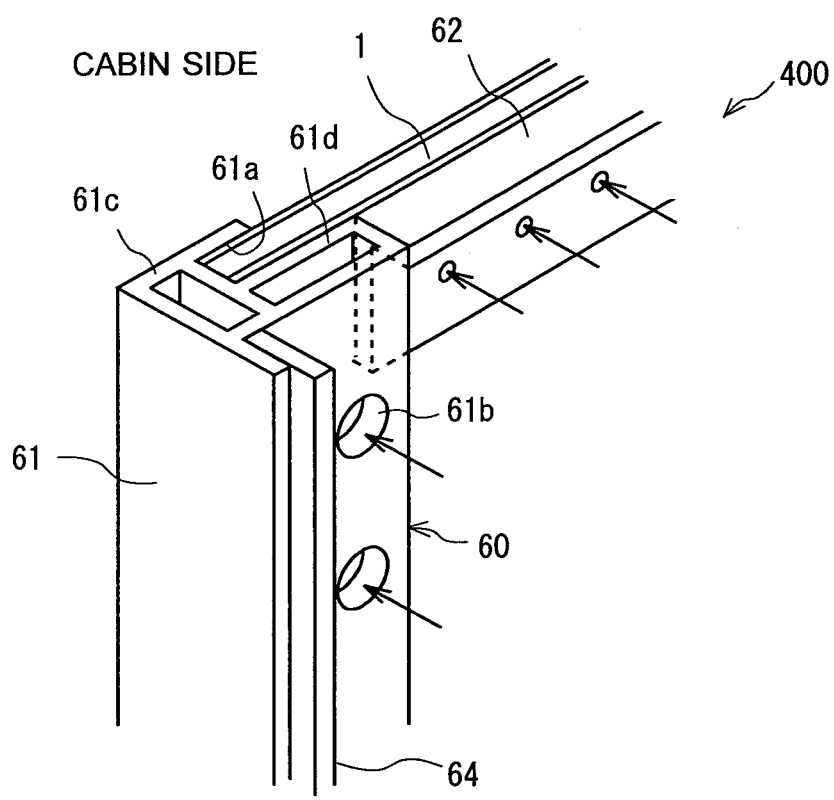
FIG. 8B is a perspective view of the interior structure according to Embodiment 4 of the present invention.

Next, an interior structure 400 according to the Embodiment 4 will be described with reference to FIG. 8A to FIG. 9B. The interior structure 400 according to the present embodiment can be applied, for example, to an interior panel that forms a door pocket. FIG. 8A is a horizontal cross-sectional view of the interior structure 400 according to the present embodiment. FIG. 8B is a perspective view of the interior structure 400 according to the present embodiment. The arrows in FIG. 8B indicate the attaching direction of the fastening member 11 (the same applies to FIG. 9B).

As shown in FIG. 8A, the interior structure 400 according to the present embodiment includes the interior panel 1, a support member 60, and the fastening member 11. Among these, the interior panel 1 has the same configuration as the interior panel 1 according to each of the above-described embodiments. The fastening member 11 also has the same configuration as the fastening member 11 (blind rivet) according to each of the above-described embodiments. The support member 60 according to the present embodiment is fastened by welding and the like mainly to a ceiling section and a floor section of the carbody. The support member 60 may be fastened to an outer board F7 using the fastening bolt 13 and the like, and can also function as a body framing of the vehicle. In such a configuration, even when a large number of passengers board the cabin and a high pressure is applied to the interior panel forming the door pocket, because sufficient strength and stiffness are ensured by the support member 60, the interior panel 1 does not become deformed, and a space for allowing a door 63 to move is secured between the outer board F7 and the interior panel 1. In FIG. 8A, a rubber board 64 prevents entry of foreign matter into the door pocket.

As shown in FIG. 8B, the support member 60 is positioned in one end portion in the width direction of the interior panel 1, and mainly includes a vertical support member 61 that extends in a vertical direction of the vehicle, and a horizontal support member 62 that is positioned in the upper portion and the lower portion of the interior panel 1 and extends in the width direction. Among these, as shown in FIG. 8A, the vertical support member 61, when viewed from a cross-section, has a first frame portion 61c having a rectangular frame shape that is elongate in the width direction, a second frame portion 61d having a rectangular frame shape that is elongate in the thickness direction, and a groove 61a into which the interior panel 1 can be inserted. The interior panel 1 that is inserted into the above-described groove 61a is fastened to a portion of the second frame portion 61d on the cabin side. The interior panel 1 is fastened by the fastening member 11 (blind rivet). In a manner similar to those according to the above-described embodiments, the fastening member 11 is not exposed on the cabin side. Furthermore, a work hole 61b is formed in a portion of the second frame portion 61d on the side opposite of the cabin, to correspond to the location of the fastening member 11. The work hole 61b is used to fasten together the support member 61 and the interior panel 1 using the fastening member 11. On the other hand, the horizontal support member 62 is formed such that the cross-section in the vertical direction is L-shaped. The upper portion and the lower portion of the interior panel 1 are fastened to the horizontal support member 62. The interior panel 1 is fastened by the fastening member 11.

Figure 9A:
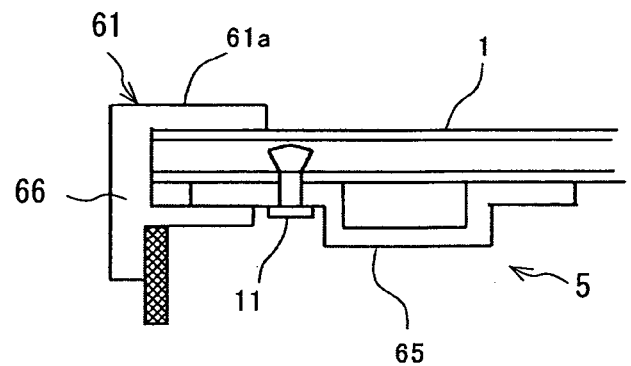
FIG. 9A is a diagram of a modification example of the interior structure according to Embodiment 4 of the present invention.
Figure 9B:
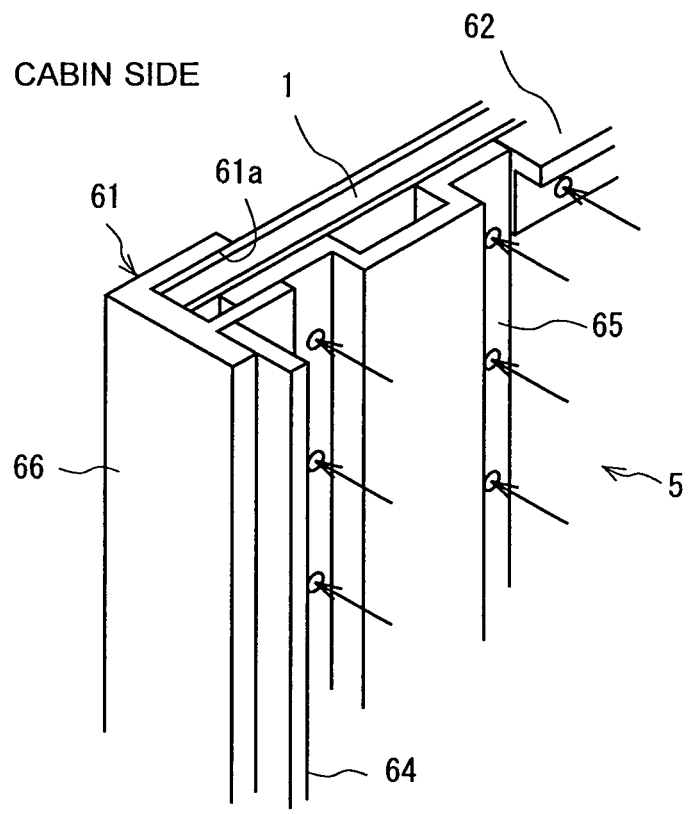
FIG. 9B is a diagram of a modification example of the interior structure according to Embodiment 4 of the present invention.

As described above, because the vertical support member 61 has a cross-sectional shape in which the first frame section 61c and the second frame section 61d having rectangular frame shapes are combined, the support member 60 according to the present embodiment has high stiffness and the overall interior structure 400 also has high strength. However, the configuration of the vertical support member 61 is not limited to that described above. For example, as shown in FIG. 9A and FIG. 9B, the vertical support member 61 may include two portions, a cover portion 66 and a reinforcement portion 65. The cover portion 66 has a groove 66a into which the interior panel 1 and the reinforcement portion 65 are inserted, and is configured to cover the end portion of the interior panel 1. In addition, the cross-section of the reinforcement portion 65 including a rectangular frame portion, thereby increasing stiffness. The interior panel 1 is fastened to the reinforcement portion 65 by the fastening member 11 (blind rivet). The material of the cover portion 66 is preferably aluminum, and the material of the reinforcement portion 65 is preferably stainless steel that is stronger and stiffer.

Figure 11A:
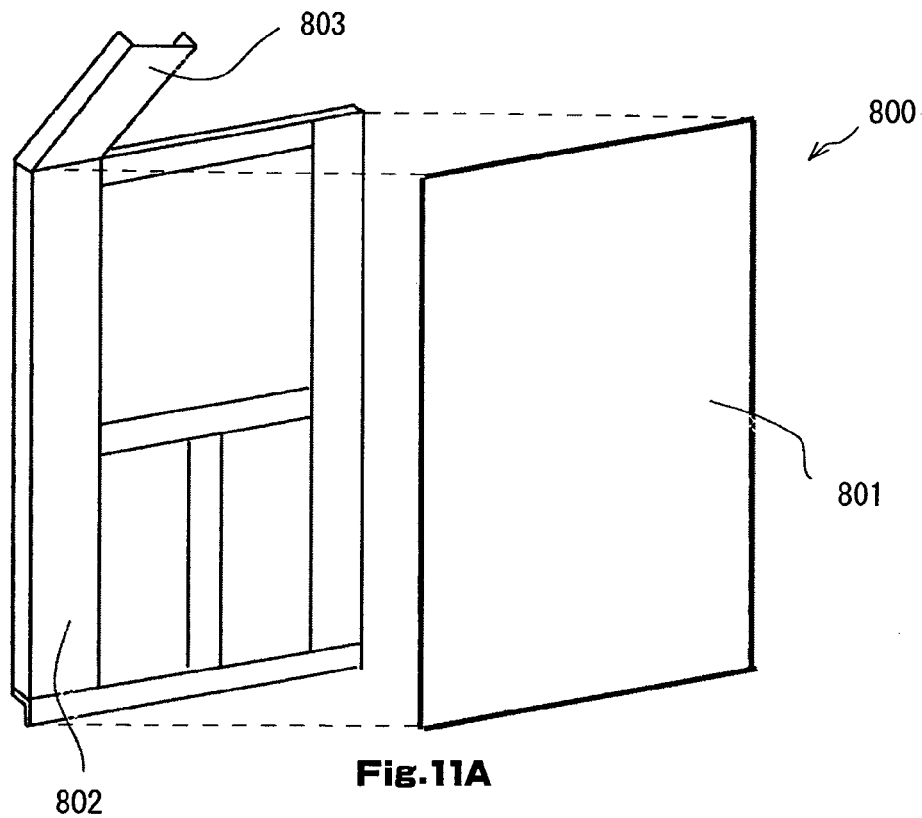
FIG. 11A is a diagram of a conventional interior structure.
Figure 11B:
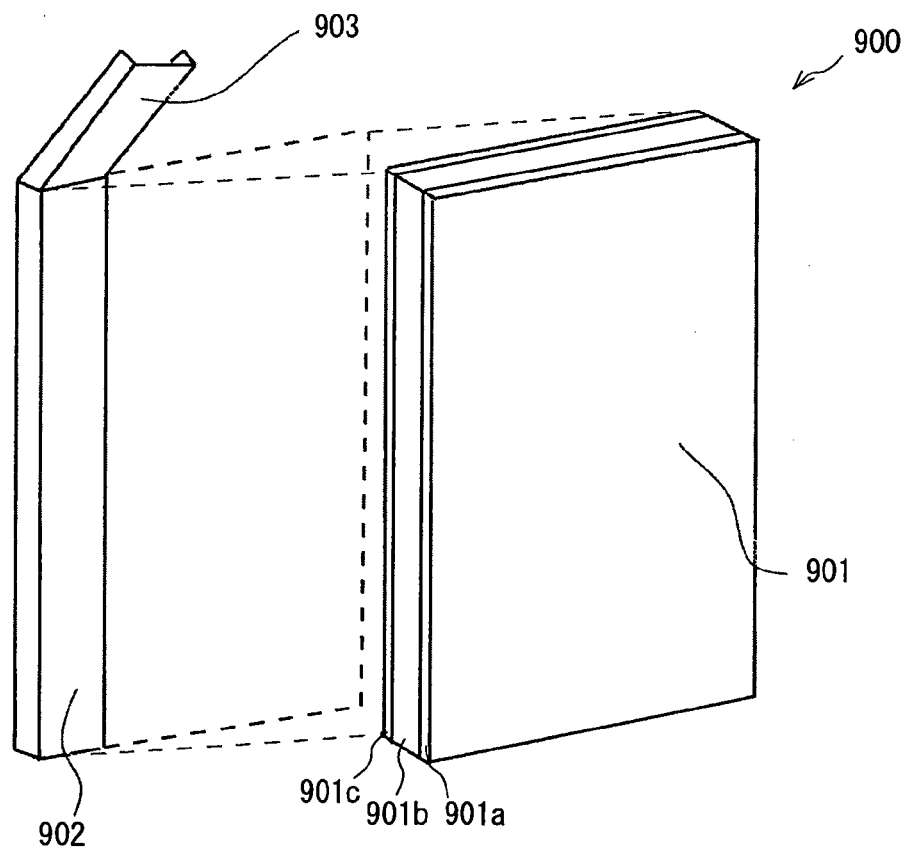
FIG. 11B is a diagram of a conventional interior structure.

Here, the interior structure 400 according to the present embodiment will be compared to conventional interior structures 800 and 900 (shown in FIG. 11A and FIG. 11B) that are similarly the door pocket section. Under the conditions for comparison, all interior structures are configured to have the same strength. First, regarding weight, the interior structure 400 according to the present embodiment and the sandwich-type interior structure 900 (the core material being a vinyl chloride foam material) are both 23 kg, whereas the frame-type internal structure 800 is 42 kg. This is because the frame-type interior structure 800 has a reinforcement frame 802 made of metal that is heavy in weight, as described above. If the manufacturing cost of the interior structure 400 according to the present embodiment is 1, the manufacturing cost of the frame-type interior structure 800 is 1.6, and the manufacturing cost of the sandwich-type interior structure 900 is 1.8. A reason for this is that general-purpose items can be used for the interior panel 1 used in the interior structure 400 according to the present embodiment, thus leading to low unit cost. On the other contrary, the reinforcement frame 802 of the frame-type interior structure 800 requires processing such as welding, and a sandwich panel 901 of the sandwich-type interior structure 900 is a specialized item, thus leading to high unit cost. Furthermore, because the interior panel 1 according to the present embodiment can use general-purpose items, the overall manufacturing period can also be reduced. Here, comparison is limited to the interior structure of the door pocket section. However, similar effects can be achieved when the interior structures of other sections are compared.

Embodiment 5

Figure 10A:
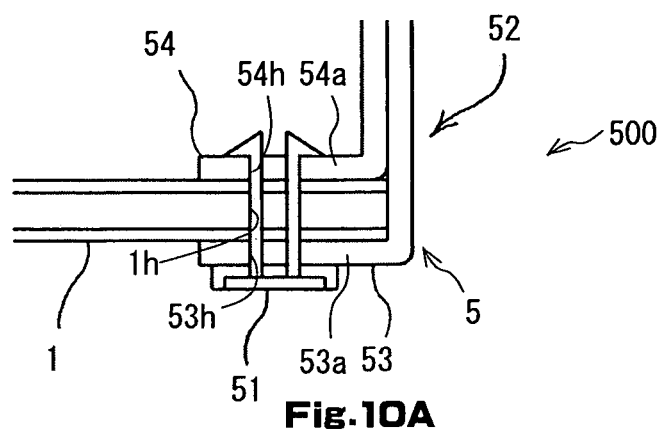
FIG. 10A is a horizontal cross-sectional view of an interior structure according to Embodiment 5 of the present invention.
Figure 10B:
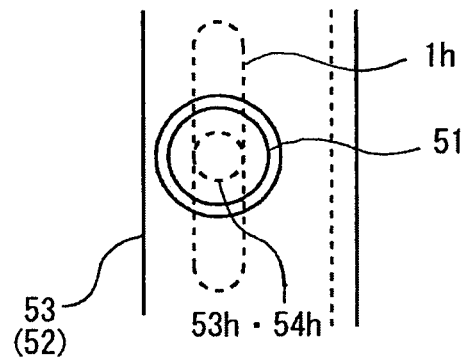
FIG. 10B is an enlarged front view of the interior structure according to Embodiment 5 of the present invention.

Next, an interior structure 500 according to Embodiment 5 will be described with reference to FIG. 10A and FIG. 10B. FIG. 10A is a horizontal cross-sectional view of the interior structure 500 according to the present embodiment. FIG. 10B is an enlarged front view of the interior structure 500 according to the present embodiment. As shown in FIG. 10A, the interior structure 500 according to the present embodiment is an interior structure of a section surrounding one side in the vehicle width direction of the internal panel 1 where an adjacent interior panel 1 is not present. The relevant portion on the one side of the interior panel 1 will hereinafter be referred to as an "edge portion".

The interior structure 500 according to the present embodiment includes the interior panel 1, a support member 52, and a fastening member 51. Among these, the interior panel 1 has basically the same configuration as the interior panel 1 according to each of the above-described embodiments. However, an elongate hole 1h that extends in the vertical direction is formed in the interior panel 1 according to the present embodiment, in a position in the edge portion corresponding to the fastening member 51.

The support member 52 according to the present embodiment mainly includes a first member 53 and a second member 54. The first member 53 and the second member 54 are both shaped so as to have an L-shaped cross-section in the vicinity of the interior panel 1, and have panel side portions 53a and 54a facing the interior panel 1 in a parallel manner. The edge portion of the interior panel 1 is sandwiched between the panel side portion 53a of the first member 53 and the panel side portion 54a of the second member 54. Furthermore, circular fastening member holes 53h and 54h are formed, into which the fastening member 51 is inserted.

The fastening member 51 according to the present invention is a resin pin having a barb. The fastening member 51 is inserted into the fastening member hole 53h in the first member 53, the elongate hole 1h in the interior panel 1, and the fastening member hole 54h in the second member 54, thereby fastening the interior panel 1 to the support member 52. The length of the elongate hole 1h of the interior panel 1 in the up-down direction is greater than the diameter of the fastening member 51. Therefore, the interior panel 1 can be moved in the up-down direction relative to the support member 52 (the fastening member 51) even after fastening by the fastening member 51, and thus, position adjustment can be made.

The Embodiment 1 to Embodiment 5 of the present invention are described above with reference to the drawings. However, specific configurations are not limited to those according to the embodiments. The present invention includes design modifications and the like that do not depart from the spirit of the invention.

REFERENCE SIGNS LIST 100, 200, 300, 400, and 500 Interior structure
1 Interior panel
2 Metal plate
3 Resin layer
4 Composite plate
5 Support means
6 Reinforcement means
7 Cover means
11 and 51 Fastening member
12, 30, 52, and 60 Support member
15 Reinforcement member
16 and 31 First support member
17 and 33 Second support member
31c, 31f, and 31g First engagement portion
33a Second engagement portion
34 Cover member
34a Cover portion
34b Mounting portion
41 Hook and loop fastener
F1, F4, and F7 Outer board (carbody)

The invention claimed is:

1. An interior structure for a railway vehicle comprising:
a plurality of interior panels forming inner walls of a cabin, each of the interior panels having a composite plate including two metal plates and a non-foam resin layer disposed between the two metal plates; and
support means for supporting the interior panels, the support means including, for each of the interior panels:
a support member that couples the interior panel and a carbody to each other; and
a first fastening member that fastens the support member to the interior panel, the first fastening member extending through the support member and being inserted into the interior panel from a surface of the interior panel on a side opposite to the cabin, wherein a tip end of the first fastening member is positioned in the resin layer and does not penetrate through a surface of the interior panel that faces the cabin.

2. The interior structure for the railway vehicle according to claim 1, wherein the two metal plates are an aluminum plate or an aluminum alloy plate, each having a thickness of 0.1 mm to 1.0 mm, and the composite plate has a thickness of 2 to 10 mm.

3. The interior structure for the railway vehicle according to claim 1, wherein
the support member is disposed at a boundary between a first interior panel and a second interior panel that are adjacent to each other, and includes:
a first support member attached to the first interior panel; and
a second support member attached to the first support member and to the second interior panel.

4. The interior structure for the railway vehicle according to claim 3, wherein:
the support means further includes a fastening bolt that fastens the support member to the carbody,
a first bolt hole into which the fastening bolt is inserted is formed in the first support member,
a second bolt hole into which the fastening bolt is inserted is formed in the second support member, and
the first bolt hole and the second bolt hole are coaxial with each other in a state where the first support member and the second support member are combined at predetermined relative positions.

5. The interior structure of the railway vehicle according to claim 4, wherein:
a gap is formed between the first interior panel and the second interior panel; panel, and a size of the gap is at least greater than a size of the first bolt hole and a size of the second bolt hole.

6. The interior structure of the railway vehicle according to claim 3, wherein:
the first support member is fastened to the carbody and includes a first engagement portion,
the second support member includes a second engagement portion which is engageable with the first engagement portion, and
the first support member and the second support member are fastened together by the second engagement portion being inserted into the first engagement portion.

7. The interior structure for the railway vehicle according to claim 6, wherein:
the first engagement portion has a groove shape that is open towards the second engagement portion, and
the second engagement portion has a projecting shape that projects towards the first engagement portion.

8. The interior structure for the railway vehicle according to claim 1, further comprising:
reinforcement means including a reinforcement member that reinforces the interior panel and a second fastening member that fastens the reinforcement member to the interior panel, wherein
the second fastening member extends through the reinforcement member and is inserted into the interior panel from the surface of the interior panel on the side opposite to the cabin, such that a tip end of the second fastening member is positioned in the resin layer.

9. The interior structure for the railway vehicle according to claim 8, further comprising:
cover means including a cover member that covers a gap formed between a first interior panel and a second interior panel from the cabin side, and a third fastening member that fastens the cover member to the first interior panel and the second interior panel, wherein
the cover member includes:
a cover portion positioned on the cabin side of the interior panel; and
a mounting portion coupled with the cover portion and positioned on a side of the interior panel which is opposite to the cabin side, wherein
the third fastening member extends through the mounting portion and is inserted into the interior panel from the surface of the interior panel on the side opposite to the cabin, such that a tip end of the third fastening member is positioned in the resin layer.

* * * * *